(12) United States Patent
Eschenhagen

(10) Patent No.: US 9,669,779 B2
(45) Date of Patent: Jun. 6, 2017

(54) METHOD FOR OPERATING A MULTI-VOLTAGE ELECTRICAL SYSTEM OF A MOTOR VEHICLE, A MULTI-VOLTAGE ELECTRICAL SYSTEM AND MEANS FOR IMPLEMENTING THE METHOD

(71) Applicant: Robert Bosch GmbH, Stuttgart (DE)

(72) Inventor: Marc Eschenhagen, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 351 days.

(21) Appl. No.: 14/246,748

(22) Filed: Apr. 7, 2014

(65) Prior Publication Data
US 2014/0306521 A1    Oct. 16, 2014

(30) Foreign Application Priority Data

Apr. 10, 2013  (DE) ........................ 10 2013 206 298

(51) Int. Cl.
*B60R 16/03* (2006.01)
*B60L 3/00* (2006.01)
(Continued)

(52) U.S. Cl.
CPC ............ *B60R 16/03* (2013.01); *B60L 3/0046* (2013.01); *B60L 11/1868* (2013.01); *H02J 1/08* (2013.01); *B60L 2210/12* (2013.01); *B60L 2210/14* (2013.01); *B60L 2240/526* (2013.01); *B60L 2240/527* (2013.01); *B60L 2240/529* (2013.01); *B60L 2240/547* (2013.01); *B60L 2240/549* (2013.01); *F02N 11/0862* (2013.01); *F02N 11/0866* (2013.01); *F02N 2011/0888* (2013.01); *H02J 2001/008* (2013.01);
(Continued)

(58) Field of Classification Search
CPC ....................................................... H02J 1/08
USPC ........................................................ 307/9.1
See application file for complete search history.

(56) References Cited

U.S. PATENT DOCUMENTS 7,407,025 B2    8/2008  Urakabe et al.
2006/0048983 A1  3/2006  Urakabe et al.
(Continued)

FOREIGN PATENT DOCUMENTS

DE         196 45 944       5/1998
DE      10 2004 036 042     2/2006
(Continued)

*Primary Examiner* — Rexford Barnie
*Assistant Examiner* — Daniel Kessie
(74) *Attorney, Agent, or Firm* — Gerard Messina

(57) ABSTRACT

A multi-voltage electrical system of a motor vehicle includes first and second subsystems operable at operating voltages, where a current is selectively and alternatively feedable from the first subsystem into the second subsystem and from the second subsystem into the first subsystem, and an electrical consumer is coupleable to and decoupleable from the first subsystem. A method for operating the system includes, responsive to a failure or lack of an attenuator, implementing a special operating mode in which negative and positive sudden load variations caused by coupling or decoupling of the electrical consumer is counteracted by, respectively, feeding current from the second subsystem into the first subsystem or vice versa, in each case over a respective feed time period.

20 Claims, 3 Drawing Sheets

(51) Int. Cl.
*B60L 11/18* (2006.01)
*H02J 1/08* (2006.01)
F02N 11/08 (2006.01)
H02J 1/00 (2006.01)

(52) U.S. Cl.
CPC ........ *Y02T 10/7005* (2013.01); *Y02T 10/7066* (2013.01); *Y02T 10/7225* (2013.01); *Y02T 10/7233* (2013.01)

(56) References Cited

U.S. PATENT DOCUMENTS

| | | | |
|---|---|---|---|
| 2006/0208491 A1* | 9/2006 | Wolf | H02J 7/1423 290/1 R |
| 2010/0087961 A1* | 4/2010 | Velez | H02J 7/0063 700/292 |
| 2011/0320080 A1* | 12/2011 | Lehner | B60K 6/442 701/22 |
| 2014/0354040 A1* | 12/2014 | Reichow | B60R 16/03 307/9.1 |

FOREIGN PATENT DOCUMENTS

| | | | | |
|---|---|---|---|---|
| DE | 10 2005 057 306 | | 6/2007 | |
| DE | 10 2011 086 829 | | 5/2013 | |
| DE | 102011086829 A1 | * | 5/2013 | ............... H02J 1/08 |
| EP | 1 138 539 B1 | | 10/2001 | |
| EP | 1 219 493 B1 | | 7/2002 | |
| JP | 2007-259511 A1 | | 10/2007 | |
| JP | 2012-021687 A | | 2/2012 | |
| WO | WO 2013075975 A1 | * | 5/2013 | ............... H02J 1/08 |

* cited by examiner ure 25 referred to in this case as "operating voltages." In particular,
METHOD FOR OPERATING A MULTI-VOLTAGE ELECTRICAL SYSTEM OF A MOTOR VEHICLE, A MULTI-VOLTAGE ELECTRICAL SYSTEM AND MEANS FOR IMPLEMENTING THE METHOD

FIELD OF THE INVENTION

The present invention relates to a method for operating a multi-voltage electrical system for a motor vehicle, which includes a first subsystem operable at a first operating voltage and a second subsystem operable at a second operating voltage, a corresponding multi-voltage electrical system and means for implementing the method.

BACKGROUND

So-called multi-voltage electrical systems for motor vehicles are known in principle. Multi-voltage electrical systems are used, for example, when consumers in a motor vehicle have different performance requirements. Multi-voltage electrical systems, as the term is used in this application, include so-called subsystems which are configured to operate at the same or at different voltage levels, referred to in this case as "operating voltages." In particular, multi-voltage electrical systems may be designed as dual voltage electrical systems, in which the operating voltages may total 48 V (in a so-called high voltage subsystem) and 12 V (in a so-called low voltage subsystem).

Two subsystems of a multi-voltage electrical system may be connected to each other via a DC/DC converter. At least one of the two subsystems includes a generator operable electric machine which feeds the respective subsystem. The respective other subsystem connected via the DC/DC converter may in turn be fed from the subsystem having the generator operable electric machine if the other subsystem itself does not include a generator operable electric machine.

In principle, the present invention may be used for all multi-voltage electrical systems for motor vehicles which have a first subsystem operable at a first operating voltage and a second subsystem operable at a second operating voltage. The operating voltages may be identical or different. Identical operating voltages in two subsystems are used, for example, when in one of the subsystems safety-related electrical consumers are grouped which are intended to be protected from potential voltage spikes or voltage drops in the respective other subsystem. Thus, the use of the present invention is not limited to dual-voltage electrical systems, i.e., electrical systems with exactly two subsystems. Multi-voltage electrical systems, however, include at least two subsystems referred to within the scope of this application as "first subsystem" and "second subsystem." In conventional dual-voltage electrical systems, for example, the first subsystem has a higher operating voltage (high voltage subsystem) and the second subsystem has a lower operating voltage (low voltage subsystem).

However, the present invention relates in particular to the dual-voltage electrical system explained, in which a generator operable electric machine is provided in only one of the (two) subsystems. In this connection, the subsystem (of a dual- or multi-voltage electrical system), as the term is used in this application, which includes the generator operable electric machine, is referred to as the first subsystem. The second subsystem is then fed from the first subsystem via the DC/DC converter. Conventional DC/DC converters are typically installed as separate devices having a separate housing or as separate devices in a housing together with a pulse controlled inverter or a battery. A corresponding DC/DC converter, as mentioned, has the task of ensuring the exchange of energy between the subsystems.

Multi-voltage electrical systems are used, in particular, in so-called recuperation systems for recovering brake energy. For the purpose of recuperation, at least one generator operable electric machine is integrated into the first subsystem and designed to be able to provide sufficient braking power. The electrical system must therefore be designed as a multi-voltage electrical system. In this connection, it is known from JP 2007-259511 A1, U.S. Pat. No. 7,407,025, EP 1 219 493 B1, JP 2012-021687 A, and EP 1 138 539 B1 to use a DC/DC converter for stabilizing the voltage supply of the second subsystem.

An attenuator is typically provided in the first subsystem, for example, in the high voltage subsystem explained, which includes the generator operable electric machine and which is configured to supply the second or additional subsystems via the DC/DC converter. A so-called high voltage battery, for example, is installed in a high voltage subsystem. The attenuator may also be a capacitor (in particular a so-called super capacitor).

Typically, consumers situated in the first subsystem are coupled to the first subsystem and may be decoupled from it. The terms "couple" and "decouple" include all measures which in each case cause a current to flow into the respective consumers or a corresponding current to be suppressed, for example a switching on and off. The consumers in the first subsystem are naturally those which have correspondingly high performance requirements. If an attenuator is present in the first subsystem, sudden load variations caused by coupling or decoupling of corresponding consumers are then sufficiently compensated for by the attenuator. This means that coupling or decoupling of corresponding consumers causes no sudden load variation, which manifests itself in the form of a sudden rise in voltage or sudden drop in voltage. A corresponding voltage may fall or rise, but this occurs within a time window in which the generator operable electric machine has sufficient time to compensate for the load increase or load reduction by increasing or reducing its power output.

Problems arise, however, when a corresponding attenuator in the first subsystem fails and/or must be switched off. In such cases, it is possible to maintain the energy supply of the motor vehicle only with difficulty, because sudden load variations caused by the coupling or decoupling of the consumers may result in strong voltage fluctuations. If the generator in the first subsystem is not able to adjust corresponding sudden load variations rapidly enough, undervoltages or overvoltages may occur.

Hence, the first subsystem and, potentially, the second subsystem (through degradation of the interconnected DC/DC converter) may acquire an undervoltage when a consumer is coupled and an overvoltage when a consumer is decoupled. The result of this may be, for example, that a touch voltage limit cannot be adhered to or a provided overvoltage protective circuit is overloaded. Depending on the provided regulating strategy, voltage fluctuations may lead to consumer failures within the first subsystem or to failure of the entire first subsystem.

Moreover, switching the generator to the de-energized state (i.e., with no corresponding energy store in the first subsystem) is not readily possible, particularly if the control panel and/or the controller is/are supplied from the first subsystem. Therefore, a corresponding system in such cases is normally switched to a safe state which, however, includes switching off the first subsystem, and the vehicle malfunctions.

SUMMARY

Hence, there continues to be the need for improved options for operating corresponding multi-voltage electrical systems.

Against this background, example embodiments of the present invention provide a method for operating a multi-voltage electrical system for a motor vehicle, which includes a first subsystem operable at a first operating voltage and a second subsystem operable at a second operating voltage, and a corresponding multi-voltage electrical system.

The present invention may be used in multi-voltage electrical systems, the subsystems of which have identical or essentially identical operating voltages. The present invention may also be used in, and is described below with reference to, dual-voltage electrical systems in which a considerable difference exists between the operating voltages of the two subsystems, but is explicitly not limited to such dual-voltage electrical systems. As explained, consumers in such multi-voltage electrical systems may be coupled to the first subsystem and may be decoupled from the first subsystem. As also explained, in the event of a failure of an attenuator in the first subsystem, negative or positive sudden load variations may occur in the event of a corresponding coupling or decoupling. These are manifested as voltage drops or voltage spikes.

According to example embodiments of the present invention, a multi-voltage electrical system is designed such that a current may be selectively fed from the first subsystem into the second subsystem or from the second subsystem into the first subsystem. According to the present invention, a special operating mode is provided in this connection, in which a negative sudden load variation caused by coupling of at least one consumer to the first subsystem is counteracted by feeding current from the second subsystem into the first subsystem, and a positive sudden load variation caused by decoupling of at least one consumer from the first subsystem is counteracted by feeding current from the first subsystem into the second subsystem. Such "counteracting" occurs in each case over a limited "feed time period."

The respective current may be fed in the form of an increase in a current normally fed via the DC/DC converter into the second subsystem and/or in the form of a reduction of a corresponding current, e.g., based on a normal value.

Such a special operating mode is carried out, in particular, if a failure of an attenuator provided in the first subsystem occurs. This may be detected, for example, by a measuring circuit, or is known if a corresponding attenuator, for example, a battery, is actively switched off.

The current is fed from the second subsystem into the first subsystem or vice versa advantageously over the respective feed time periods to allow a generator operable electric machine provided in the first subsystem sufficient time to counteract the respective (negative or positive) sudden load variations by a corresponding adjustment. Thus, during the feed time periods a power output of a generator operable electric machine provided in the first subsystem is gradually increased in the case of a negative sudden load variation and gradually reduced in the case of a positive sudden load variation. The duration of the respective time periods is determined by the capabilities of the generator operable electric machine.

Thus, positive and negative sudden load variations are essentially compensated for using the measures according to the present invention. In addition, a switching on of the generator operable electric machine in the first subsystem without the attenuator, for example, without a battery, is possible in the first subsystem because, for this purpose, a current may be fed from the second subsystem.

In summary, within the scope of the present invention, the respective current feed, as explained, may have an attenuating effect on the corresponding sudden load variations in the event of failure of an attenuator (for example, a battery) situated in the first subsystem, and therefore, in the event of loss of a corresponding attenuating behavior of this attenuator. To feed the current in such a case, a DC/DC converter in particular is used which is bi-directionally operable. Such DC/DC converters have significantly lower time constants than do electric machines due to the lack of masses to be moved. A corresponding intervention gives the generator operable electric machine sufficient time to adapt its power output.

The method according to example embodiment of the present invention is used in particular in dual-voltage electrical systems, in which the first operating voltage is higher than the second operating voltage. In this case, a DC/DC converter, selectively operable as a step-down converter or a step-up converter, is used to feed the current from the first subsystem into the second subsystem, or from the second subsystem into the first subsystem. Such DC/DC converters are also known as step-down, step-up converters or as buck-boost converters. The DC/DC converter used within the scope of the present invention may, for example, shift its operating mode according to a corresponding activation from a step-down converter operation (for example, 48 V to 12 V) to a step-up converter operation (for example, 12 V to 48 V).

Particular advantages result, for example, when in a corresponding special operating mode the operating voltage of the first subsystem is also reduced. This may take place, for example, in the explained dual voltage electrical systems which have different operating voltages. For example, the operating voltage of the first subsystem may be reduced from 48 V to 36 V. The level of the maximum allowable electrical system voltage is thus potentially increased so that also sudden load variations which are not completely adjustable do not result in inadmissible voltage values, for example, exceeding the maximum allowable touch voltage.

Feeding the current from the first subsystem into the second subsystem in this mode may result in a particularly strong charging of the present battery (for example, a lead-acid battery) or even in its outgassing. This may also be used as a measure for draining excess energy. It may also be provided to briefly convert corresponding energy into heat with the aid of the DC/DC converter. This enables an efficient "discharge" of excess energy.

According to an example embodiment, a processor unit, for example, a control unit of a motor vehicle, is programmed to carry out a method according to the present invention.

The implementation of the method in the form of software is also advantageous, since this involves particularly low costs, in particular if a performing control unit is also used for other tasks and is therefore present anyway. Suitable data media for providing the computer program are, for example, diskettes, hard disks, flash memories, EEPROMs, CD-ROMs, DVDs and the like. It is also possible to download a program from computer networks (e.g., the Internet, an intranet, etc.).

Additional advantages and embodiments of the present invention are understood from the description and the appended drawing.

It is understood that the features cited above and those to be explained below are applicable not only in each specified combination, but also in other combinations or alone, without departing from the scope of the present invention The present invention is schematically shown in the drawings with reference to example embodiments and is explained in greater detail below with reference to the drawings.

DETAILED DESCRIPTION

Figure 1:
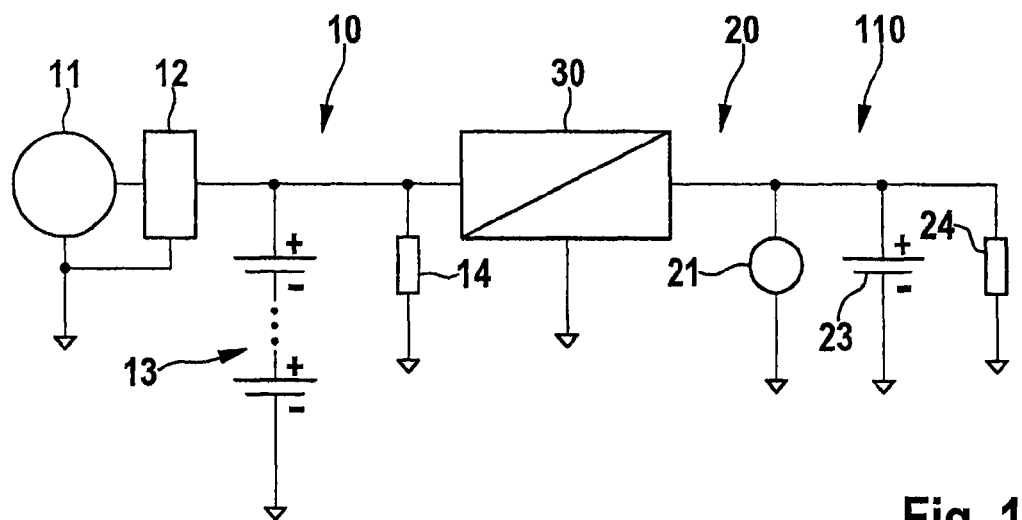
FIG. 1 is a schematic circuit diagram of a conventional dual-voltage electrical system.

In the figures, corresponding elements of the various drawings are denoted by identical reference numerals. For the sake of clarity, these will not be repeatedly explained.

FIG. 1 is a schematic circuit diagram of a conventional dual-voltage electrical system 110. Dual-voltage electrical system 110 has a first subsystem 10 and a second subsystem 20. In this embodiment, first subsystem 10 is designed, for example, for operation at 48 V as an operating voltage. Second subsystem 20 in this embodiment is designed, for example, for operation at 12 V as an operating voltage. Thus, first subsystem 10 is a so-called high voltage subsystem, and second subsystem 20 is a so-called low voltage subsystem.

An electric machine 11 having a converter 12 is provided in first subsystem 10. Electric machine 11 may be at least generator operated and may feed a current into first subsystem 20 via converter 12. In particular, electric machine 11 may also be motor operated. For example, braking power may be recovered in so-called recuperation systems with the aid of electric machine 11, and/or the instantaneous power of an internal combustion engine may be boosted.

Provided in first subsystem 10 is a correspondingly designed energy store 13, which is configured for operation with the first operating voltage, for example, a battery or a capacitor. A consumer 14 is schematically illustrated in subsystem 10.

Provided in second subsystem 20 is a starter motor 21, for example, which may be used for a start of a motor vehicle, in which dual-voltage electrical system 110 is formed. Also provided in second subsystem 20 is an energy store 23 also configured for a corresponding operating voltage, for example, a conventional vehicle battery. Here, a consumer 24 is also schematically illustrated.

First subsystem 10 and second subsystem 20 are connected to one another via a DC/DC converter 30. In the example shown, a generator operable electric machine 11 is provided only in first subsystem 10, so that ultimately second subsystem 20 is fed exclusively from first subsystem 10. "Fed exclusively" also expressly includes a feed with the aid of energy store 23, which is itself in turn charged from first subsystem 10.

A control unit 50 (not shown in FIG. 1) is configured to activate dual-voltage electrical system 110 via activation lines 51.

Figure 2:
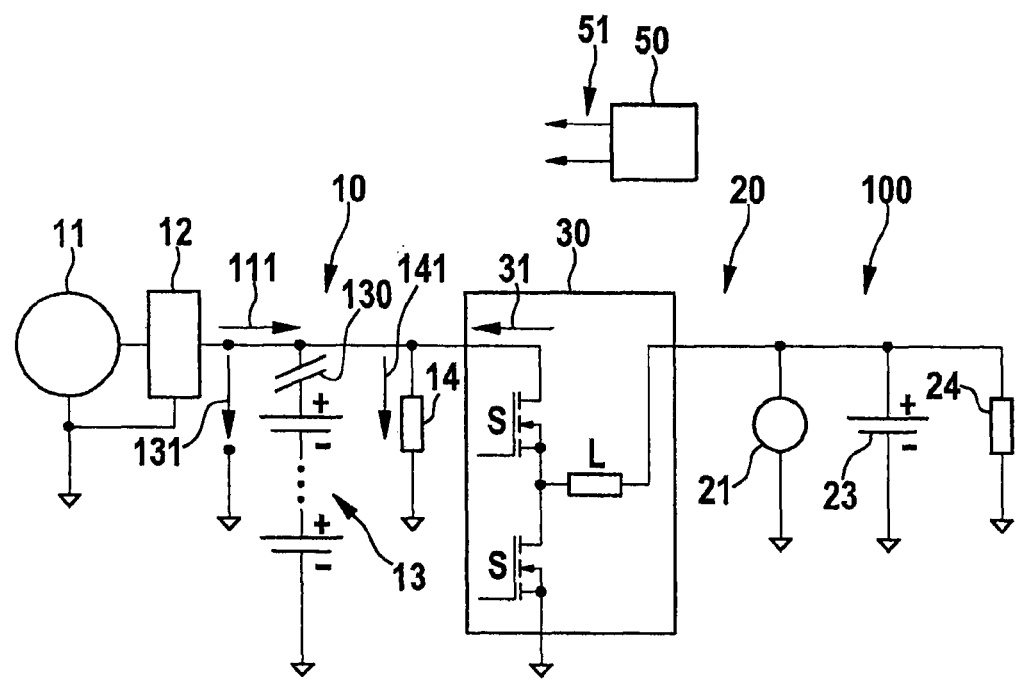
FIG. 2 is a schematic circuit diagram of an operable dual-voltage electrical system according to an example embodiment of the present invention.

FIG. 2 is a schematic circuit diagram of a dual-voltage electrical system 100, which is operable according to an example embodiment of the present invention. Dual-voltage electrical system 100, as shown, includes all the components of previously explained dual-voltage electrical system 110 (cf. FIG. 1). Here, a (potential) interruption of a contact between battery 13 and first subsystem 10 is indicated by reference numeral 130. As explained, instead of battery 13, it is also possible to provide another suitable energy store, for example, a capacitor, which performs an attenuating function in first subsystem 10. In the example shown, DC/DC converter 30 is designed as an active converter including a half bridge with appropriate activatable switch elements S and an inductance L. Switch elements S may be activated, for example, by a control unit 50 via corresponding control signals 51. DC/DC converter 30 may be operated as a bi-directional converter, selectively as a step-down converter, converting a (higher) operating voltage of first subsystem 10 into a (lower) operating voltage of second subsystem 20, or as a step-up converter, vice versa.

A voltage drop against ground in first subsystem 10 is illustrated in the form of an arrow 131. A current fed by electric machine 11 is illustrated with an arrow 111. A current flowing via consumer 14 is illustrated with an arrow 141. Illustrated with an arrow 31 is a current which (in a step-up converter operation of DC/DC converter 30) is fed from second subsystem 20 into first subsystem 10.

Figure 3:
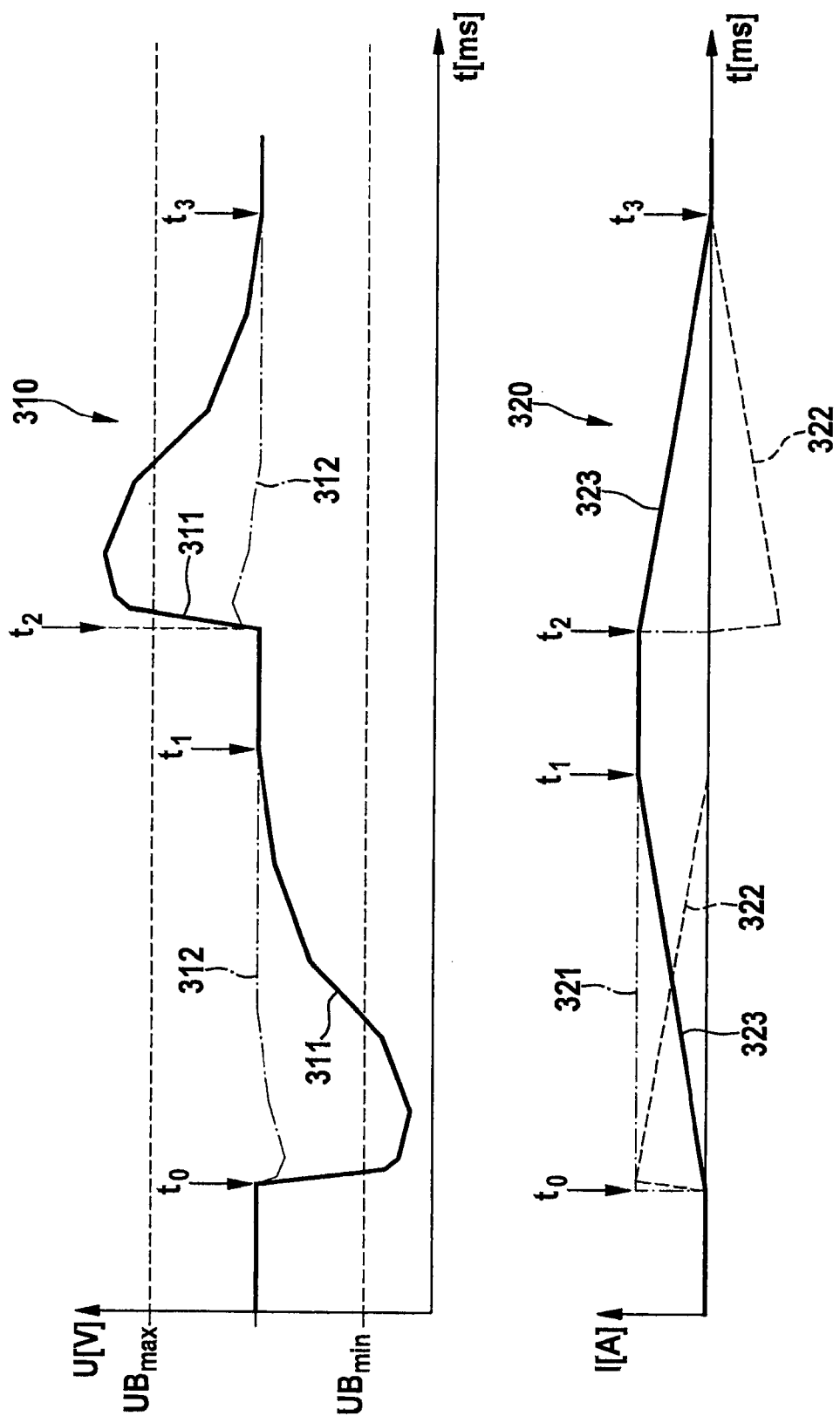
FIG. 3 shows voltage and current curves in conjunction with a method according to an example embodiment of the present invention.

The effects of a coupling or decoupling of a consumer 14 are explained in greater detail with reference to FIG. 3. FIG. 3 shows in diagrams 310 and 320 a voltage U in V, and a current I in A on the ordinate against a time t in ms on the abscissa.

A voltage curve 311 in a dual-voltage electric system 110 is illustrated in diagram 310 which occurs during a coupling or decoupling of a consumer 14, when the attenuator 13 fails. In this case, consumer 14 is coupled at a point in time $t_0$ and decoupled at a point in time $t_2$.

The coupling of consumer 14 at point in time $t_0$ results, due to lack of attenuation, in a voltage drop, which potentially falls below a minimum allowed voltage level denoted by $UB_{min}$ of dual-voltage electrical system 110. The current flowing through consumer 14 is illustrated by current curve 321 in diagram 320 (cf. arrow 141 in FIG. 2). The current fed by electric machine 11 into dual-voltage electrical system 110 is represented there by 323 (cf. arrow 111 in FIG. 2). As is apparent, electric machine 11 increases its power output and thereby feeds a greater amount of current into dual-voltage electrical system 110 to compensate for the current consumption of consumer 14. Due to the slow time constant of electric machine 11, electric machine 11 has not compensated for the increased current consumption until a point in time $t_1$. At this point in time, the operating voltage of the first subsystem has again reached the setpoint voltage, denoted here by UB.

These explanations also apply conversely to a decoupling of consumer 14. In this case, the maximum allowable operating voltage of the first subsystem, denoted here by $UB_{max}$, is potentially exceeded after a point in time $t_2$—see voltage curve 311. The voltage potentially exceeds the maximum allowable touch voltage (typically 60 V) and therefore represents a safety risk. Here too, the current fed by electric machine 11 into dual-voltage electric system 110 may only be gradually reduced.

The measures according to example embodiments of the present invention essentially include feeding a current (cf. arrow 31 in FIG. 2) from the second subsystem into the first subsystem between points in time $t_0$ and $t_1$ and feeding a current from the first subsystem into the second subsystem between points in time $t_2$ and $t_3$ (see current curves 322 in diagram 320). Sudden load variations are therefore counteracted by a corresponding feed. This results in a smoothing of the voltage curve in an operable dual-voltage electrical system 100 according to an example embodiment of the present invention, as illustrated by 312 in diagram 310.

Figure 4:
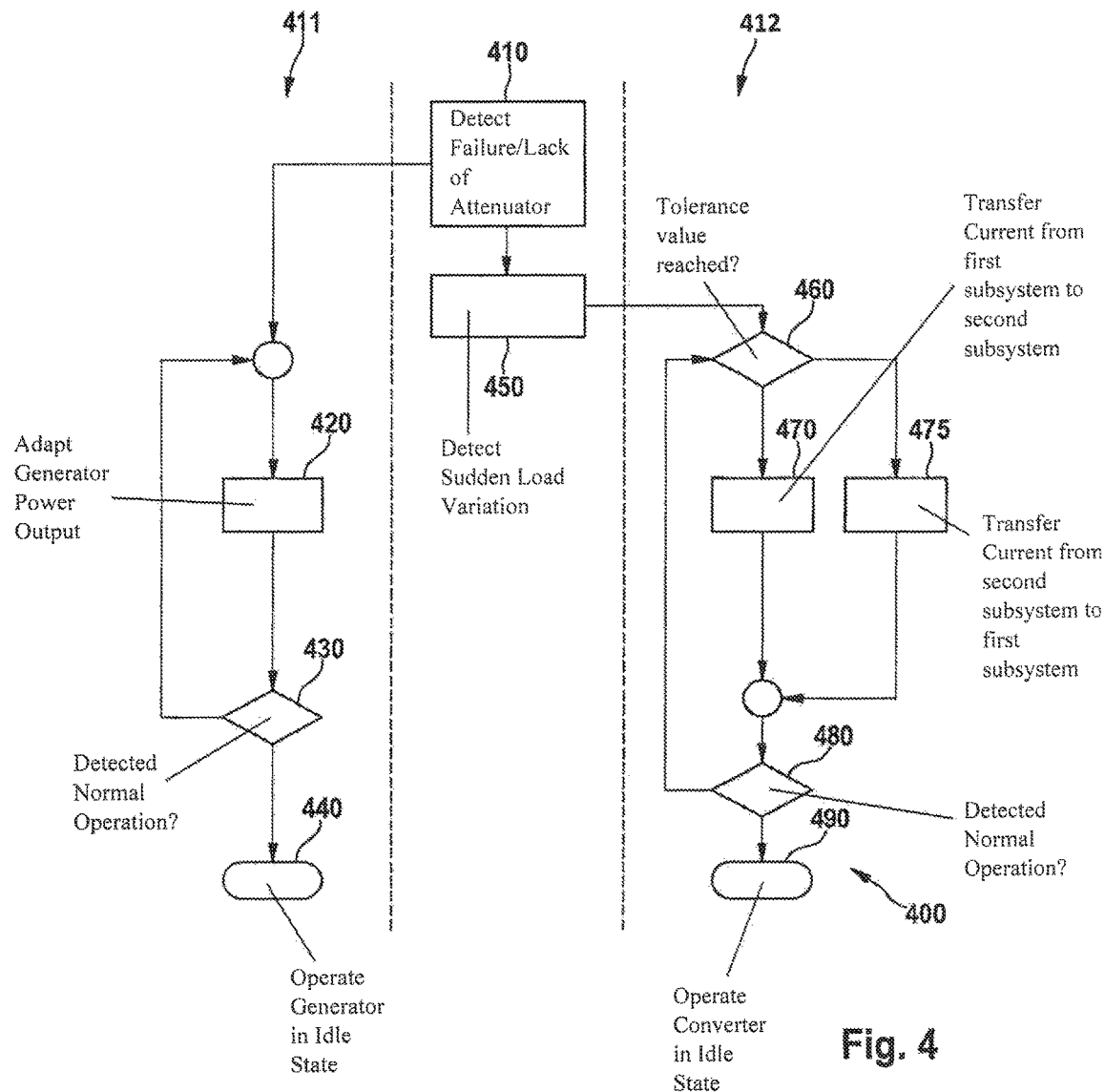
FIG. 4 is a flow chart that illustrates a method according to an example embodiment of the present invention.

FIG. 4 is a flow chart of a method according to an example embodiment of the present invention. The method includes a submethod 411 on the generator side and a submethod 412 on the converter side, as a result of which the increase or decrease in the power output of electric machine 11 on the one hand and the feeding of the currents by DC/DC converter 30 on the other hand are implemented in each case essentially in the form of a control loop.

A corresponding special operating mode 410 is then initiated if, for example, a failure of an attenuator 13 is detected in the first subsystem with the aid of a corresponding sensor structure, or a corresponding attenuator 13 is switched off.

Starting from step 410 (cf. submethod 411 on the generator side) an adaptation of the generator power output is carried out (step 420) until the presence of a normal operation is detected in a step 430, i.e., for example, a corresponding attenuator 13 is re-connected. In this case, submethod 411 on the generator side transitions to a rest state 440 or idle operation.

In a step 450 in the example shown a sudden load variation is detected, which may, for example, have a value of from 0 to 100%. In a step 460 (cf. submethod 412 on the converter side), it is checked whether this sudden load variation exceeds or falls below a potentially existing tolerance value. According to the result, either an emergency supply to the first subsystem is undertaken (step 470) by feeding current from the second subsystem into the first subsystem or as an alternative, current may be fed from the first subsystem into the second subsystem (step 475). In this case too, a corresponding submethod on the converter side is carried out (step 480) until a normal operation mode is present. In this case, submethod 412 on the converter side also transitions to a rest state 490 or idle operation.

What is claimed is:

1. A method for operating a multi-voltage electrical system of a motor vehicle, the multi-voltage electrical system including a first subsystem and a second subsystem, the first subsystem including an attenuator, a current being selectively and alternatively feedable from the first subsystem into the second subsystem and from the second subsystem into the first subsystem, and an electrical consumer being coupleable to the first subsystem and decoupleable from the first subsystem, the method comprising:

responsive to a failure of the attenuator or an off state of the attenuator provided in the first subsystem, implementing in the multi-voltage electrical system a special operating mode, in which a negative sudden load variation caused by a coupling of the electrical consumer to the first subsystem is counteracted before a minimum threshold is reached by feeding current from the second subsystem into the first subsystem, and a positive sudden load variation caused by a decoupling of the electrical consumer from the first subsystem is counteracted before a maximum threshold is reached by feeding current from the first subsystem into the second subsystem, wherein a power output of a generator in the first subsystem is adjusted in collaboration with current transfer to or from the second subsystem until a negative or positive sudden load variation is counteracted completely by the generator, after which current transfer to or from the second subsystem is stopped.

2. The method of claim 1, wherein a power output of a generator operable electric machine provided in the first subsystem is gradually increased in the case of the negative sudden load variation and gradually reduced in the case of the positive sudden load variation.

3. The method of claim 2, wherein an amount of the current fed from the second subsystem into the first subsystem in the case of the negative sudden load variation, and an amount of the current fed from the first subsystem into the second subsystem in the case of the positive sudden load variation, is gradually reduced from a maximum value.

4. The method of claim 3, wherein the reduction of the amount of each fed current occurs reciprocally to the gradual increase or reduction of the power output of the electric machine.

5. The method of claim 2, further comprising:
executing a start operation in which current is fed from the second subsystem into the first subsystem in order to start the electric machine.

6. The method of claim 1, wherein the first and second subsystems are operable at a same operating voltage as each other.

7. The method of claim 1, wherein the first subsystem is operable at a first operating voltage, and the second subsystem is operable at a second operating voltage that is different than the first operating voltage.

8. The method of claim 7, wherein the first operating voltage is higher than the second operating voltage and a DC/DC converter, selectively and alternatively operable as a step-down converter and step-up converter, is used to feed current from the first subsystem into the second subsystem and from the second subsystem into the first subsystem.

9. The method of claim 7, further comprising:
reducing the operating voltage of the first subsystem during the special operating mode.

10. A multi-voltage electrical system of a motor vehicle, comprising:
a first subsystem operable, the first subsystem including an attenuator; and
a second subsystem;
wherein:
a current is selectively and alternatively feedable from the first subsystem into the second subsystem and from the second subsystem into the first subsystem;
an electrical consumer is coupleable to the first subsystem and decoupleable from the first subsystem;
the multi-voltage electrical system includes circuitry configured to implement a special operating mode responsive to a failure of the attenuator or an off state of the attenuator in the first subsystem; and
in the special operating mode, the circuitry is configured to:
counteract a negative sudden load variation caused by a coupling of the electrical consumer to the first subsystem before a minimum threshold is reached by feeding current from the second subsystem into the first subsystem; and counteract a positive sudden load variation caused by a decoupling of the electrical consumer from the first subsystem before a maximum threshold is reached by feeding current from the first subsystem into the second subsystem, wherein a power output of a generator in the first subsystem is adjusted in collaboration with current transfer to or from the second subsystem until a negative or positive sudden load variation is counteracted completely by the generator, after which current transfer to or from the second subsystem is stopped.

11. The electrical system of claim 10, wherein a power output of a generator operable electric machine provided in the first subsystem is gradually increased in the case of the negative sudden load variation and gradually reduced in the case of the positive sudden load variation.

12. The electrical system of claim 11, wherein an amount of the current fed from the second subsystem into the first subsystem in the case of the negative sudden load variation, and an amount of the current fed from the first subsystem into the second subsystem in the case of the positive sudden load variation, is gradually reduced from a maximum value.

13. The electrical system of claim 12, wherein the reduction of the amount of each fed current occurs reciprocally to the gradual increase or reduction of the power output of the electric machine.

14. The electrical system of claim 11, wherein the system is configured to execute a start operation in which current is fed from the second subsystem into the first subsystem in order to start the electric machine.

15. The electrical system of claim 10, wherein the first and second subsystems are operable at a same operating voltage as each other.

16. The electrical system of claim 10, wherein the first subsystem is operable at a first operating voltage, and the second subsystem is operable at a second operating voltage that is different than the first operating voltage.

17. The electrical system of claim 16, wherein the first operating voltage is higher than the second operating voltage and the system further comprises a DC/DC converter that is selectively and alternatively operable as a step-down converter and step-up converter, the DC/DC converter being used to feed current from the first subsystem into the second subsystem and from the second subsystem into the first subsystem.

18. The electrical system of claim 16, wherein the system is configured to reduce the operating voltage of the first subsystem during the special operating mode.

19. A non-transitory computer-readable medium on which are stored instructions that are executable by a processor, the instructions which, when executed by the processor, cause the processor to perform a method for operating a multi-voltage electrical system of a motor vehicle, the multi-voltage electrical system including a first subsystem and a second subsystem, the first subsystem including an attenuator, a current being selectively and alternatively feedable from the first subsystem into the second subsystem and from the second subsystem into the first subsystem, and an electrical consumer being coupleable to the first subsystem and decoupleable from the first subsystem, the method comprising:

responsive to a failure of the attenuator or an off state of the attenuator provided in the first subsystem, implementing in the multi-voltage electrical system a special operating mode, in which a negative sudden load variation caused by a coupling of the electrical consumer to the first subsystem is counteracted before a minimum threshold is reached by feeding current from the second subsystem into the first subsystem, and a positive sudden load variation caused by a decoupling of the electrical consumer from the first subsystem is counteracted before a maximum threshold is reached by feeding current from the first subsystem into the second subsystem, wherein a power output of a generator in the first subsystem is adjusted in collaboration with current transfer to or from the second subsystem until a negative or positive sudden load variation is counteracted completely by the generator, after which current transfer to or from the second subsystem is stopped.

20. A computer system for operating a multi-voltage electrical system of a motor vehicle, the multi-voltage electrical system including a first subsystem and a second subsystem, the first subsystem including an attenuator, a current being selectively and alternatively feedable from the first subsystem into the second subsystem and from the second subsystem into the first subsystem, and an electrical consumer being coupleable to the first subsystem and decoupleable from the first subsystem, the computer system comprising:

a computer processor configured to:
obtain input indicating a failure of the attenuator or an off state of the attenuator provided in the first subsystem; and
responsive to the input, implement in the multi-voltage electrical system a special operating mode, in which a negative sudden load variation caused by a coupling of the electrical consumer to the first subsystem is counteracted before a minimum threshold is reached by feeding current from the second subsystem into the first subsystem, and a positive sudden load variation caused by a decoupling of the electrical consumer from the first subsystem is counteracted before a maximum threshold is reached by feeding current from the first subsystem into the second subsystem, wherein a power output of a generator in the first subsystem is adjusted in collaboration with current transfer to or from the second subsystem until a negative or positive sudden load variation is counteracted completely by the generator, after which current transfer to or from the second subsystem is stopped.

* * * * *